No. 614,615. Patented Nov. 22, 1898.
A. HUMPHREY.
APPARATUS FOR MANUFACTURING GLASS CYLINDERS.
(Application filed Dec. 4, 1897.)
(No Model.)
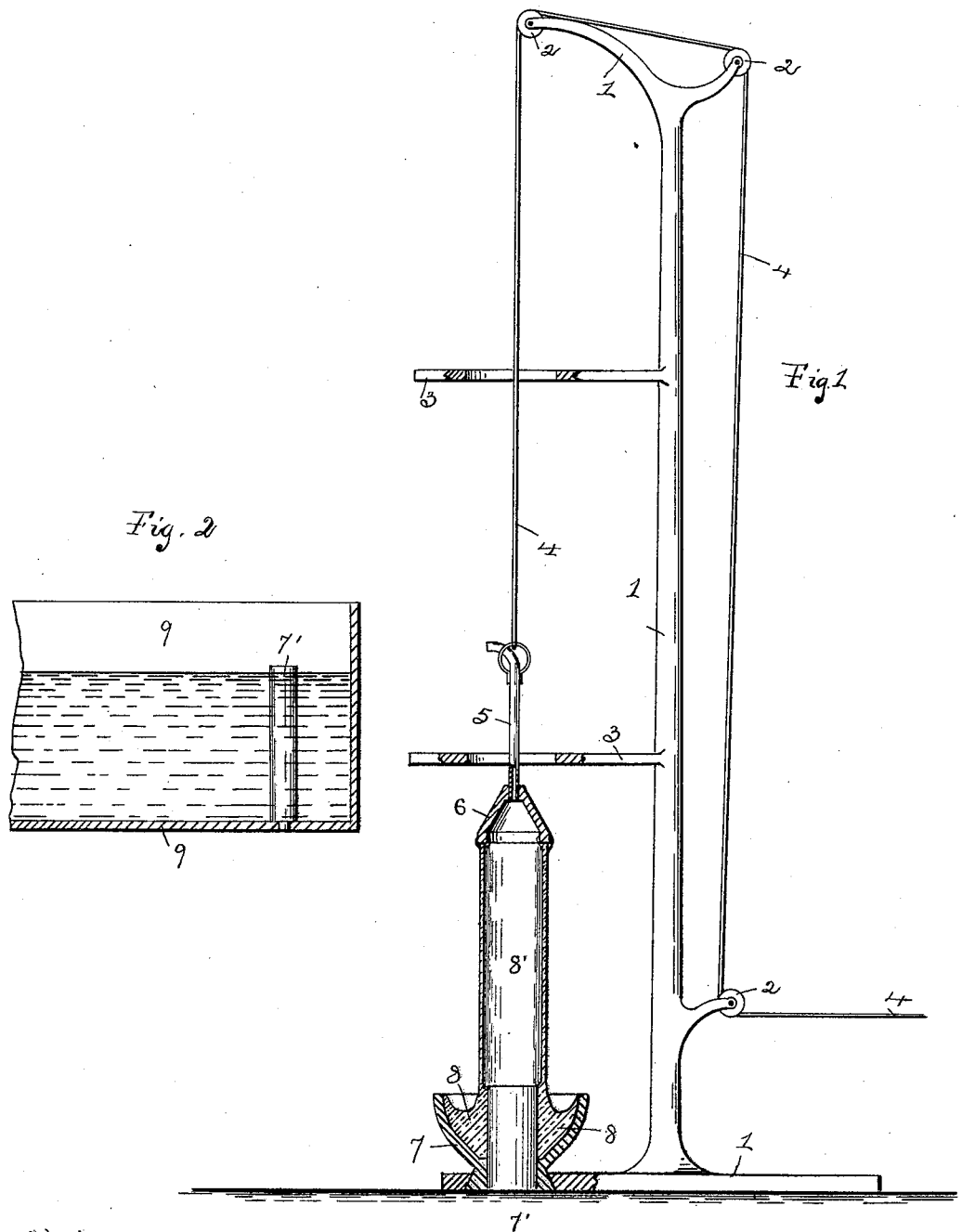

UNITED STATES PATENT OFFICE.

ALEXANDER HUMPHREY, OF FAIRMONT, WEST VIRGINIA.

APPARATUS FOR MANUFACTURING GLASS CYLINDERS.

SPECIFICATION forming part of Letters Patent No. 614,615, dated November 22, 1898.

Application filed December 4, 1897. Serial No. 660,731. (No model.)

*To all whom it may concern:*

Be it known that I, ALEXANDER HUMPHREY, a citizen of the United States, residing at Fairmont, in the county of Marion and State of West Virginia, have invented certain new and useful Improvements in Apparatus for the Manufacture of Glass Cylinders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in the art of forming glass cylinders or tubes.

The invention has for its object the provision of a new and novel means whereby glass cylinders or tubes may be formed without the aid of skilled blowers and gatherers and is more particularly adapted to forming cylinders for the manufacture of window-glass.

The invention consists in attaching a bell-shaped casting to the end of a blowpipe. This bell is heated to the proper degree and lowered down upon a suitable-sized core, which is arranged in an upright position within a pot, crucible, or tank containing melted glass. When the bell comes in contact with the melted glass, it adheres evenly around the edge of the bell, and by raising the bell by hand or other power a cylinder or tube is formed, and during the process of drawing the tube or cylinder air at suitable pressure is forced down the blowpipe into the cylinder in order to keep it of uniform diameter throughout its length. By this means cylinders or tubes of almost any diameter, length, and thickness may be drawn.

In describing the invention in detail reference is had to the accompanying drawings, forming a part of this specification, and wherein like numerals of reference indicate like parts in both views, in which—

Figure 1 is a vertical side view of the device, partly in section and as it would appear in the act of forming a cylinder or tube. Fig. 2 is a sectional view of a glass tank, showing the core arranged therein.

Referring to the drawings for the details of the device, the numeral 1 designates an upright frame having the pulleys 2 and platform 3 arranged thereon and within which are formed openings of suitable dimensions to allow the bell and cylinder to pass through. 4 is a cable or chain which is passed over the pulleys and attached to the blowpipe 5. Attached to the lower end of this blowpipe is the bell 6, and the size of this bell depends upon the diameter of the cylinder or tube to be drawn.

The numeral 7 designates a pot or crucible which may be secured in any suitable manner by which it can be conveniently held in position, and within the center of this pot or crucible is arranged the core 7', the diameter of which is a little less than the interior diameter of the bell.

In order to draw a tube or cylinder by this process, the glass, which is designated as 8, is either placed within the pot or crucible while both are in a heated state. Then, as previously stated, the bell is lowered down upon the core, which should extend a trifle above the surface of the glass, and the bell being in a heated state the glass adheres to its edges, and upon raising the bell by the rope or chain and forcing air through the tube a cylinder is formed, as indicated by 8', and the thickness of the tube will depend greatly upon the rapidity with which the cylinder is formed.

If desired, a regular tank-furnace 9, having the core 7' suitably arranged therein, may be employed instead of using pots or crucibles.

While I have shown the platforms 3 made integral with the upright frame 1, it will be obvious that they may be attached thereto in any other suitable manner, and as they are designed to hold one or more men it is essential that they should be firmly secured to the upright frame. It will be readily seen that these platforms form a very important feature of my invention, as it is necessary that the workman be at a height in accordance with the length of the cylinder to be formed.

Having thus fully shown and described my invention, what I claim as new, and desire to secure by Letters Patent, is—

1. An apparatus for the manufacture of glass cylinders consisting of an upright frame, provided at one side with a series of platforms, each platform being provided with an opening, the said frame being provided at its upper portion with diverging arms provided with pulleys, an arm at the lower portion of said frame, a pulley attached to said arm, a cable passing over said pulleys and through said openings in the platforms, a bell attached to said cable, a pipe adapted to admit air to said bell, in combination with a pot or crucible provided with a central core and adapted to contain molten glass, substantially as described.

2. An apparatus for the manufacture of glass cylinders, consisting of an upright frame provided at its upper and lower portion with pulleys, said frame being provided with a series of platforms, each provided with an opening, a cable passing over said pulleys and having one of its ends attached to a bell, means for admitting air to said bell, in combination with a pot or crucible provided with a central core, and adapted to contain molten glass, substantially as described.

3. An apparatus for the manufacture of glass cylinders consisting of the upright frame provided at intervals with platforms, said platforms being each provided with an opening, pulleys secured to the upper and lower portion of said upright frame, a cable passing over said pulleys, a blowpipe attached to said cable, a bell attached to said blowpipe, in combination with a pot or crucible, provided with a central core, adapted to contain molten glass, into which the said bell is lowered, substantially as described.

In testimony whereof I affix my signature in presence of two witnesses.

ALEXANDER HUMPHREY.

Witnesses:
JOHN GROETZINGER,
O. SIMS.